US010419754B1

(12) United States Patent
Zhao et al.

(10) Patent No.: US 10,419,754 B1
(45) Date of Patent: Sep. 17, 2019

(54) METHOD AND APPARATUS FOR VIDEO DECODING USING MULTIPLE LINE INTRA PREDICTION

(71) Applicant: Tencent America LLC, Palo Alto, CA (US)

(72) Inventors: Xin Zhao, San Diego, CA (US); Xiang Li, Los Gatos, CA (US); Shan Liu, San Jose, CA (US); Liang Zhao, Sunnyvale, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/200,533

(22) Filed: Nov. 26, 2018

Related U.S. Application Data

(60) Provisional application No. 62/651,547, filed on Apr. 2, 2018.

(51) Int. Cl.
*H04N 19/11* (2014.01)
*H04N 19/184* (2014.01)
*H04N 19/176* (2014.01)

(52) U.S. Cl.
CPC ........... *H04N 19/11* (2014.11); *H04N 19/176* (2014.11); *H04N 19/184* (2014.11)

(58) Field of Classification Search
CPC ..... H04N 19/11; H04N 19/176; H04N 19/184
USPC .................................................. 375/240.12
See application file for complete search history.

(56) References Cited

U.S. PATENT DOCUMENTS

| | | | |
|---|---|---|---|
| 9,363,511 B2 | 6/2016 | Zhang et al. | |
| 9,769,472 B2 | 9/2017 | Liu et al. | |
| 2014/0086323 A1 | 3/2014 | Chuang et al. | |
| 2017/0272745 A1 | 9/2017 | Liu et al. | |
| 2017/0310959 A1 | 10/2017 | Chen et al. | |
| 2017/0347103 A1* | 11/2017 | Yu | H04N 19/126 |
| 2017/0353730 A1* | 12/2017 | Liu | H04N 19/122 |
| 2017/0374369 A1 | 12/2017 | Chuang et al. | |
| 2018/0332284 A1* | 11/2018 | Liu | H04N 19/139 |

OTHER PUBLICATIONS

X. Zhang, S. Liu, S. Lei, "Intra mode coding in HEVC standard", Visual Communications and Image Processing (VCIP), 2012 IEEE.
Xin Zhao, Vadim Seregin, Amir Said, Marta Karczewicz, "EE1 related: Simplification and extension of PDPC", Joint Video Exploration Team of ITU-T SG16 WP3 and ISO/IEC JTC1/SC29/WG11, JVET-H0057, 8th Meeting: Macao, CN, Oct. 18-24, 2017.

(Continued)

*Primary Examiner* — Marnie A Matt
(74) *Attorney, Agent, or Firm* — Oblon, McClelland, Maier & Neustadt, L.L.P.

(57) ABSTRACT

Aspects of the disclosure provide method and apparatus for video coding. In some examples, an apparatus includes receiving circuitry and processing circuitry. The processing circuitry decodes prediction information of a block from a coded video bitstream. The prediction information is indicative of a reference line selected from a plurality of potential reference lines and an intra prediction mode selected from a set of potential intra prediction modes that is associated with the reference line. Then the processing circuitry reconstructs at least one sample of the block according to the intra prediction mode and at least one reference sample in the reference line.

18 Claims, 15 Drawing Sheets

(56) References Cited

OTHER PUBLICATIONS

X. Zhang, S. Liu, S. Lei, "Intra mode coding with fixed length binarization", Joint Collaborative Team on Video Coding (JCT-VC) of ITU-T SG16 WP3 and ISO/IEC JTC1/SC29/WG11, 8th Meeting, JCTVC-H0435, pp. 1-5.

Yao-Jen Chang, Po-Han Lin, Chun-Lung Lin, Jih-Sheng Tu, and Ching-Chieh Lin, "Arbitrary reference tier for intra directional modes", Joint Video Exploration Team of ITU-T SG16 WP3 and ISO/IEC JTC1/SC29/WG11, JVET-O0043, 3th Meeting: Geneva, CH, May 26-Jun. 1, 2016.

Vadim Seregin, Wei-Jung Chien, Marta Karczewicz, and Nan Hu, "Block shape dependent intra mode coding", Joint Video Exploration Team of ITU-T SG16 WP3 and ISO/IEC JTC1/SC29/WG11, JVET-D0114, 4th Meeting: Chengdu, CN, Oct. 15-21, 2016.

Yu Han, Jicheng An, and Jianhua Zheng, "Improvements for Intra Prediction Mode Coding", Joint Video Exploration Team of ITU-T SG16 WP3 and ISO/IEC JTC1/SC29/WG11, JVET-G060, 7th Meeting: Torino, IT, Jul. 13-21, 2017.

\* cited by examiner

METHOD AND APPARATUS FOR VIDEO DECODING USING MULTIPLE LINE INTRA PREDICTION

INCORPORATION BY REFERENCE

This present disclosure claims the benefit of priority to U.S. Provisional Application No. 62/651,547, "METHODS AND APPARATUS FOR MULTIPLE LINE INTRA PREDICTION IN VIDEO COMPRESSION" filed on Apr. 2, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used in as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer bits are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring samples values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 35 possible predictor directions. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower right of sample (101), in a 22.5 degree angle from the horizontal.

Still referring to FIG. 1, on the top right there is depicted a square block (104) of 4×4 samples (indicated by a dashed, boldface line). The square block (104) includes 16 samples, each labelled with an "S", its position in Y dimension (e.g., row index) and its position in X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples, that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can be sometimes be predicted from neighboring directions used in neighboring, already decoded, blocks.

The mapping of an intra prediction directions bits in the coded video bitstream that represent the direction can be different from video coding technology to video coding technology; and can range, for example, from simple direct mappings of prediction direction to intra prediction mode to codewords, to complex adaptive schemes involving most probable modes and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide method and apparatus for video coding. In some examples, an apparatus includes receiving circuitry and processing circuitry. The processing circuitry decodes prediction information of a block from a coded video bitstream. The prediction information is indicative of a reference line selected from a plurality of potential reference lines and an intra prediction mode selected from a set of potential intra prediction modes that is associated with the reference line. Then the processing circuitry reconstructs at least one sample of the block according to the intra prediction mode and at least one reference sample in the reference line.

In some embodiments, the prediction information is indicative of a non-zero reference line and a first set of potential intra prediction modes associated with the non-zero reference line has a smaller number of potential intra prediction modes compared to a second set of potential intra prediction modes associated with a zero reference line. In an example, the first set of potential intra prediction modes comprises directional intra prediction modes with even mode indexes. In another example, the first set of potential intra prediction modes lacks directional intra prediction modes with odd mode indexes. In some examples, the first set of potential intra prediction modes comprises DC and planar modes.

In an embodiment, the first set of potential intra prediction modes includes only most probable modes. In an example, the first set of potential intra prediction modes comprises the most probable modes that are derived from directional intra prediction modes with even mode indexes.

In some embodiments, the processing circuitry decodes a first signal that is indicative of the intra prediction mode and selectively decodes a second signal for the reference line based on the intra prediction mode. In an example, the processing circuitry decodes the second signal that is received after the first signal to determine the reference line when the intra prediction mode is a directional intra prediction mode with an even mode index. Then, the processing circuitry determines the reference line to be a default reference line when the intra prediction mode is one of a directional intra prediction mode with an odd mode index, a planar mode and a DC mode.

In another example, the processing circuitry decodes the second signal that is received after the first signal to determine the reference line when the intra prediction mode is one of most probable modes. Then, the processing circuitry determines the reference line to be a default reference line when the intra prediction mode is not one of the most probable modes.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
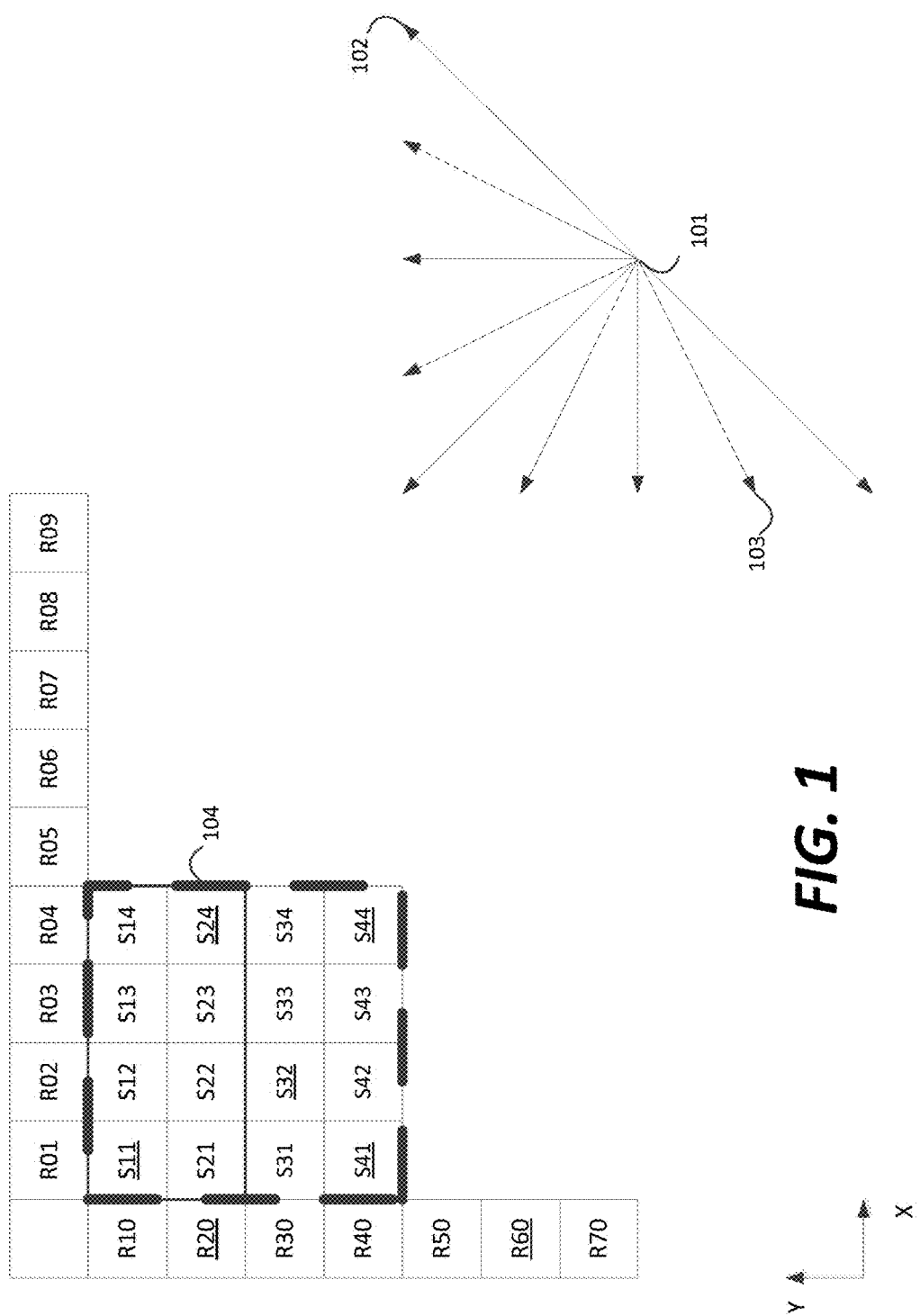
FIG. 1 is a schematic illustration of a subset of intra prediction modes in accordance with H.265.
Figure 2:
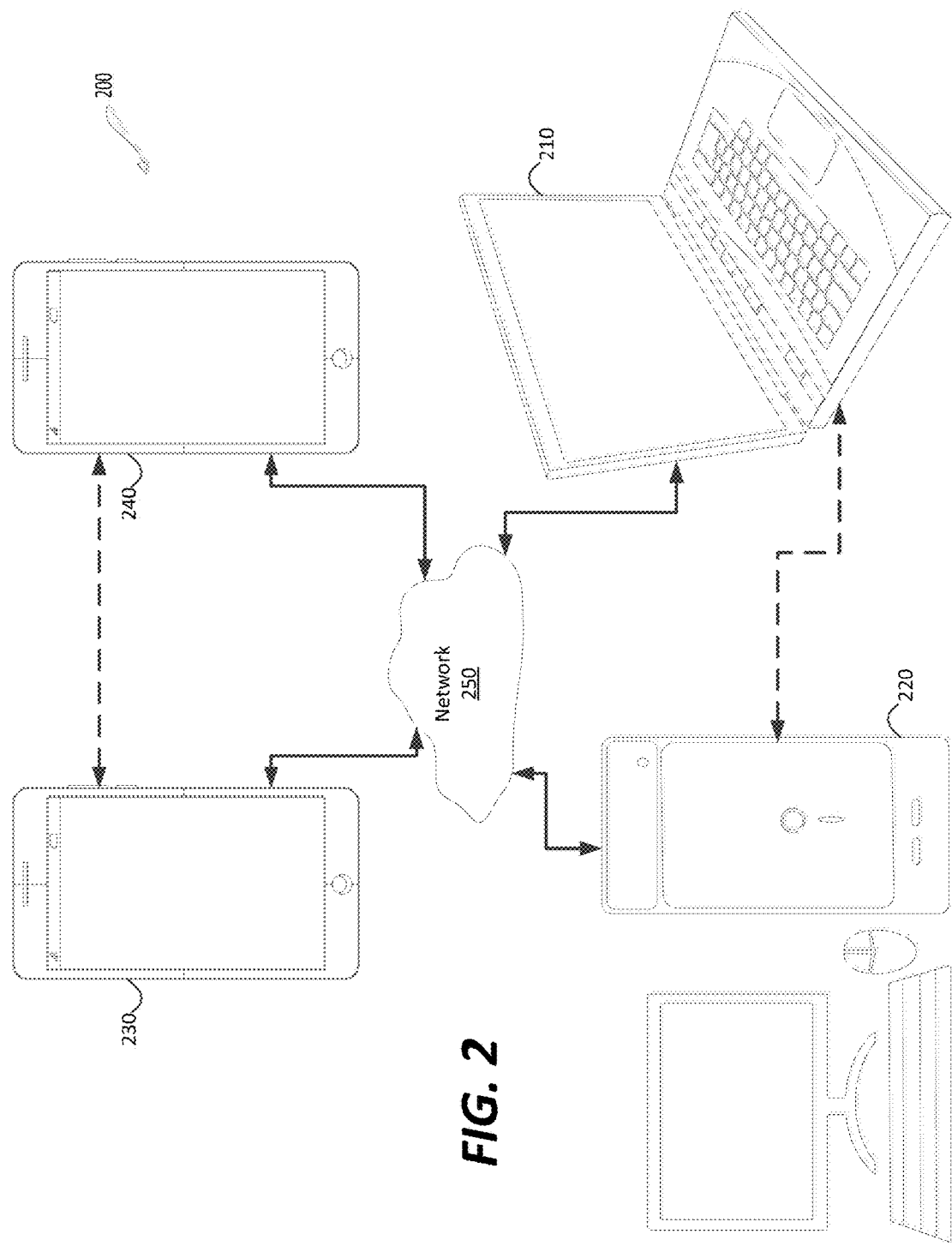
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
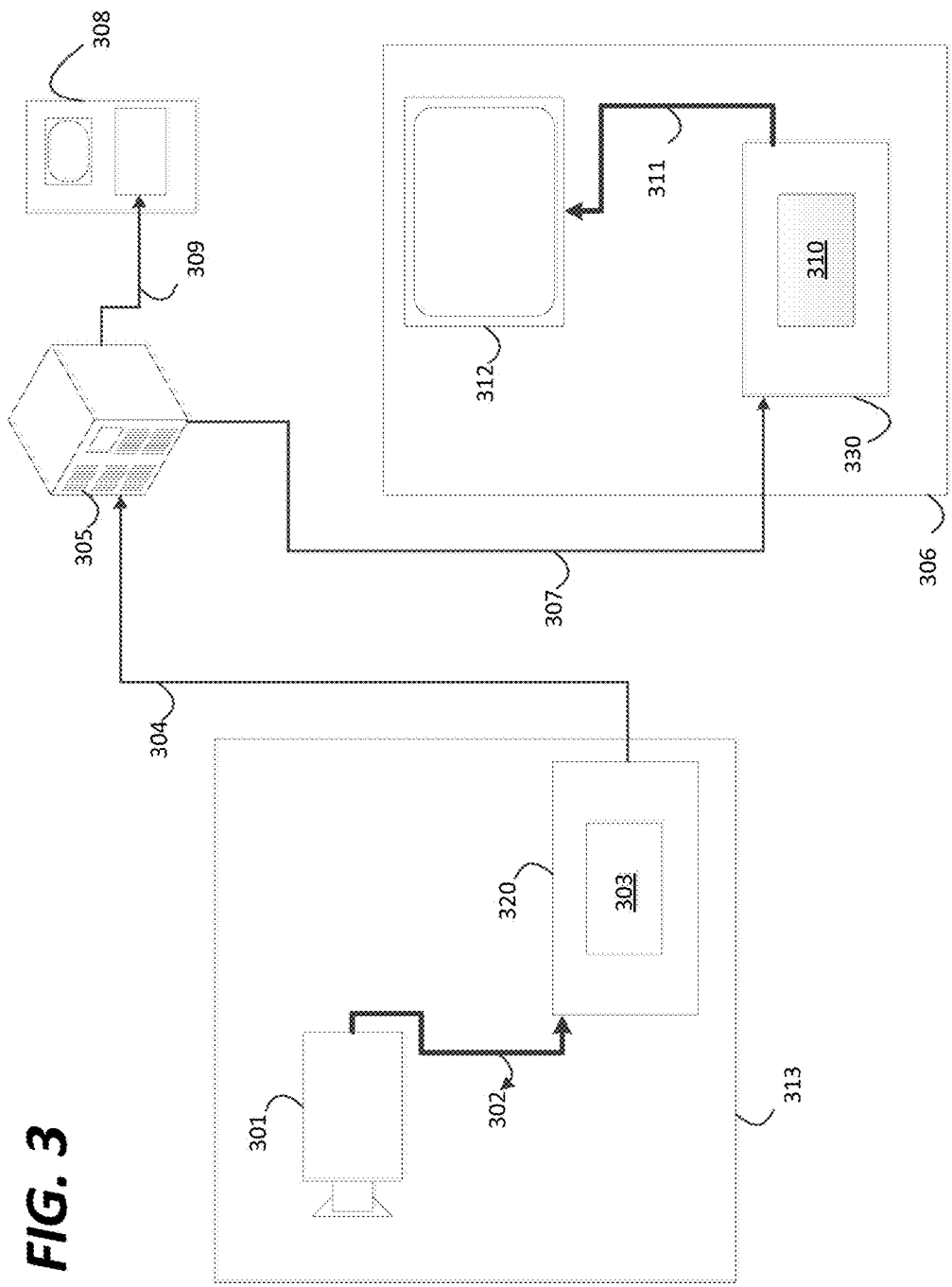
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
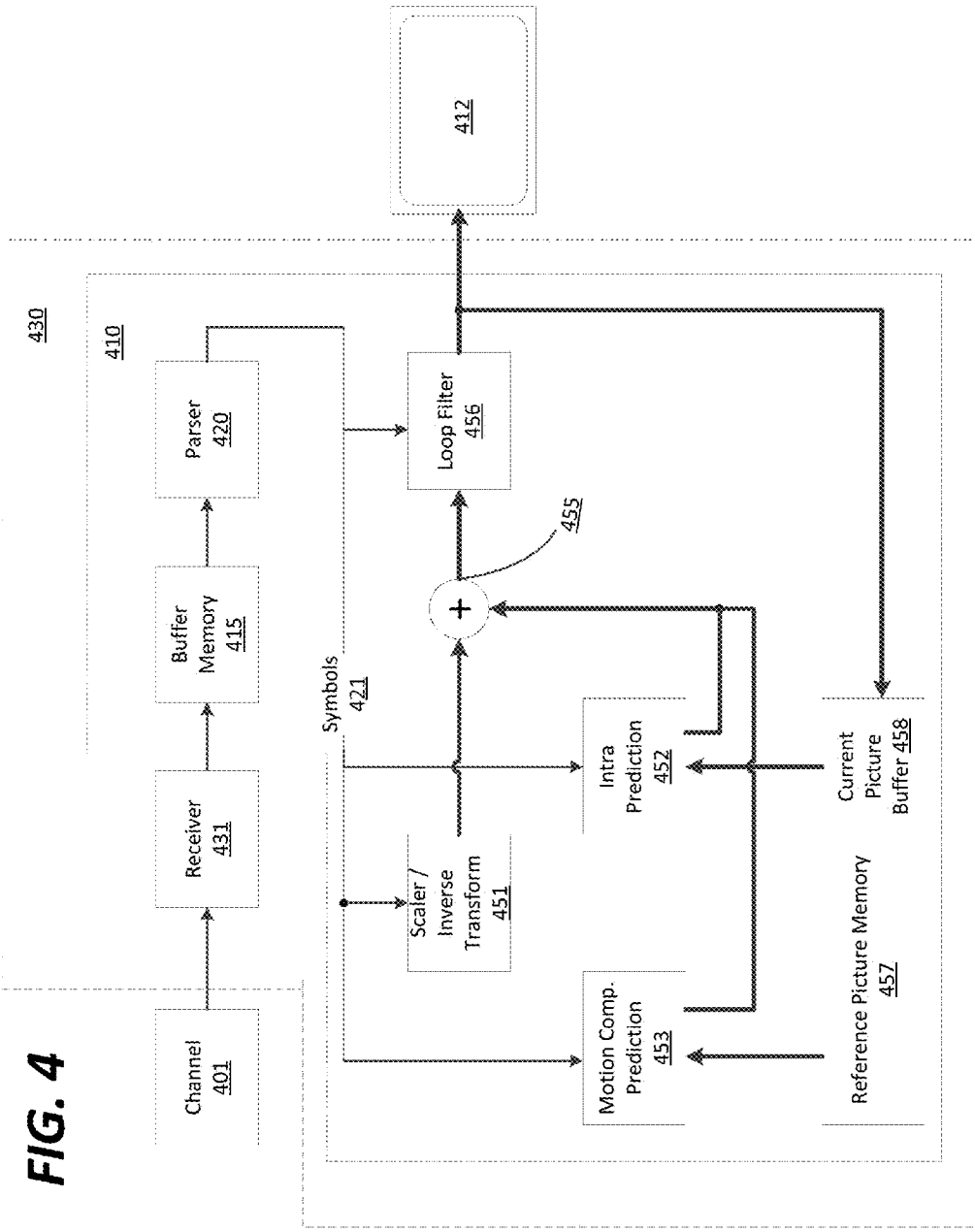
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
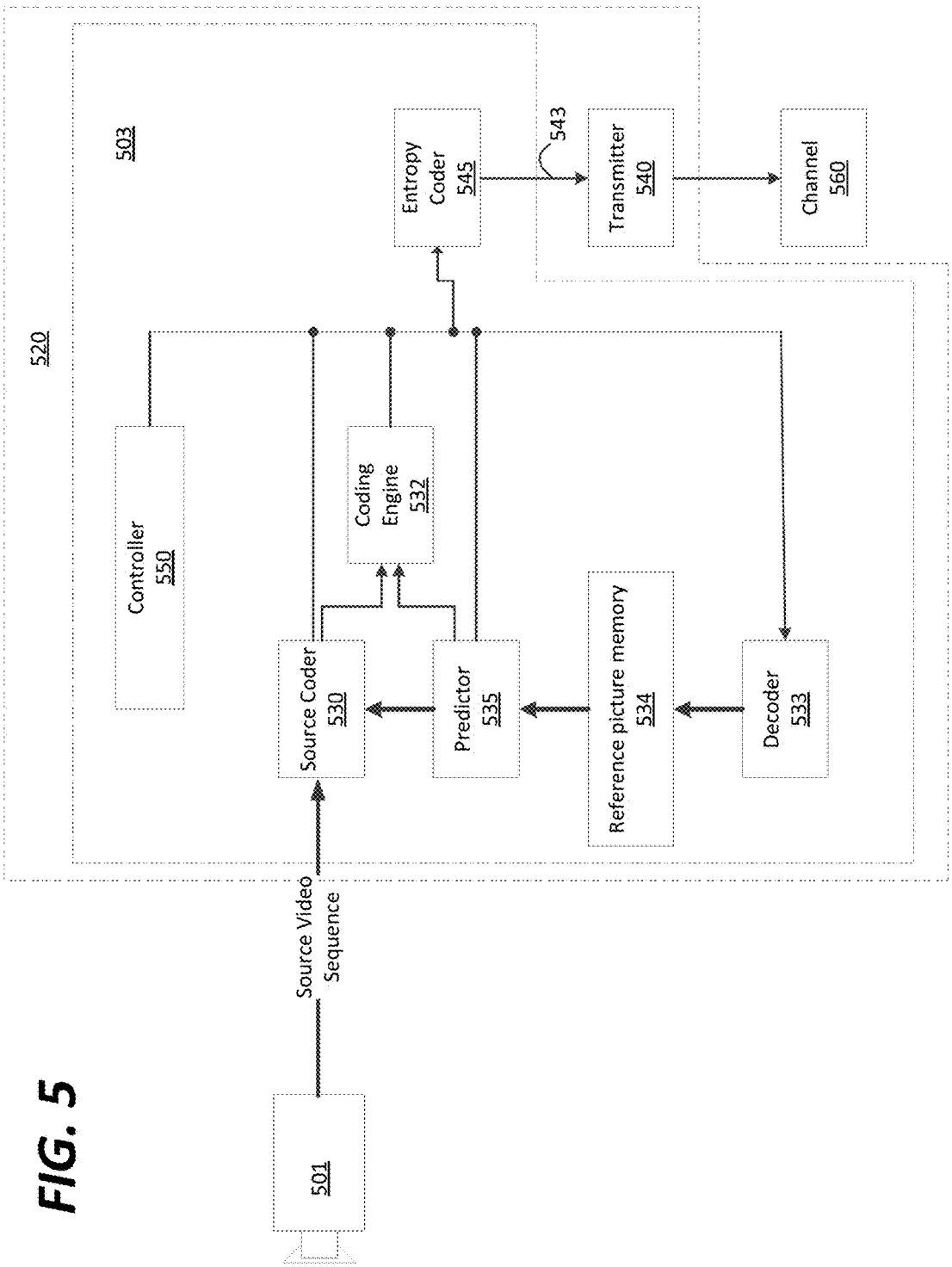
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501)(that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used.

A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
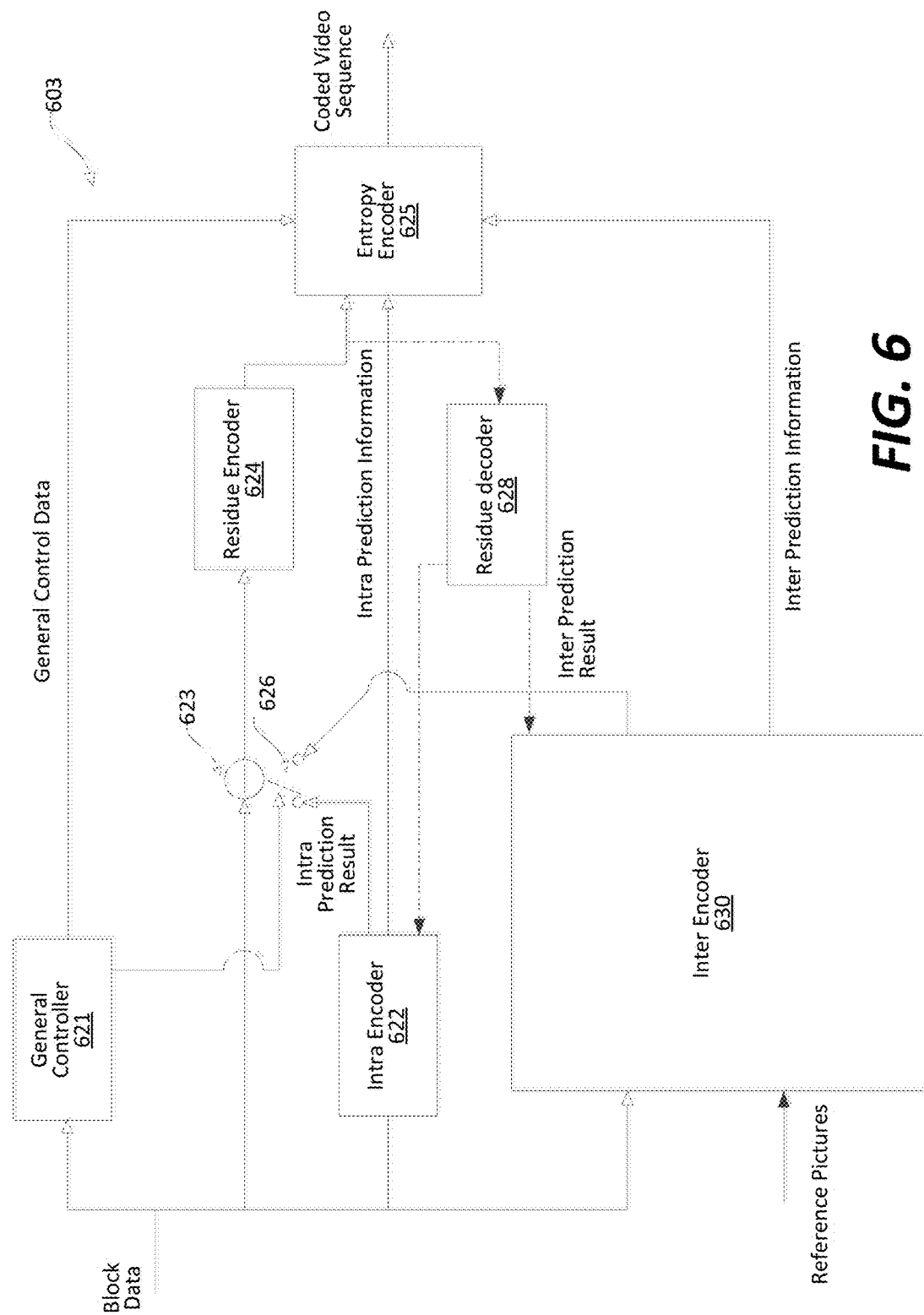
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
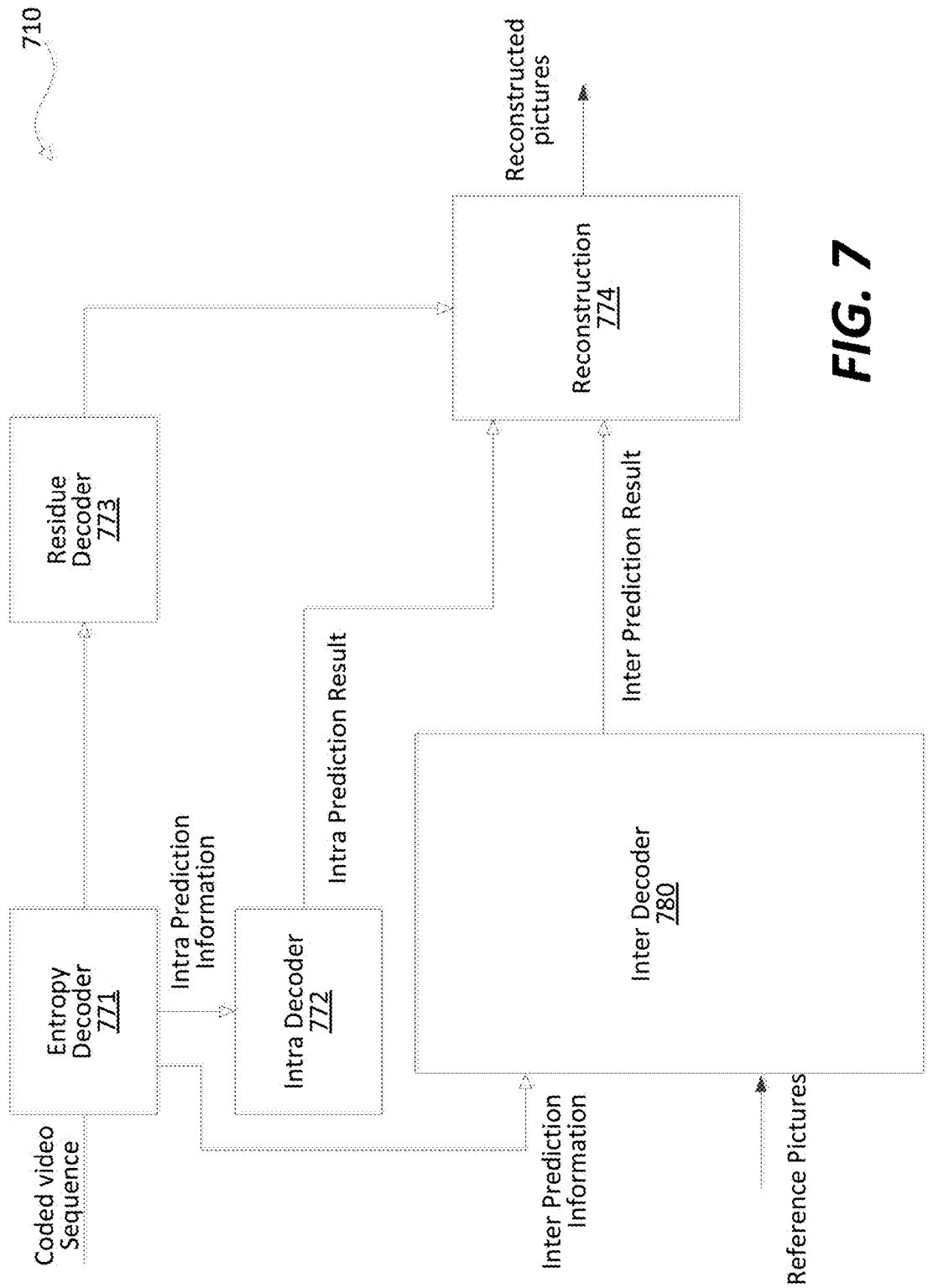
FIG. 7 shows a block diagram of a decoder in accordance with another embodiment.

FIG. 7 shows a diagram of a video decoder (710) according to another embodiment of the disclosure. The video decoder (710) is configured to receive a coded pictures that are part of a coded video sequence, and decode the coded picture to generate a reconstructed picture. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (772) or the inter decoder (780) respectively residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (datapath not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503) and (603), and the video decoders (310), (410) and (710) can be implemented using any suitable technique. In an embodiment, the video encoders (303), (503) and (603), and the video decoders (310), (410) and (710) can be implemented using one or more integrated circuits. In another embodiment, the video encoders (303), (503) and (503), and the video decoders (310), (410) and (710) can be implemented using one or more processors that execute software instructions.

Aspects of the disclosure provide techniques for multiple-line intra prediction.

To capture the arbitrary edge directions presented in natural video, the number of directional intra modes can be extended, for example, from 33 to 65, and the like. Generally, the planar and DC modes remain the same. The denser directional intra prediction modes apply for all block sizes and for both luma and chroma intra predictions.

Figure 8:
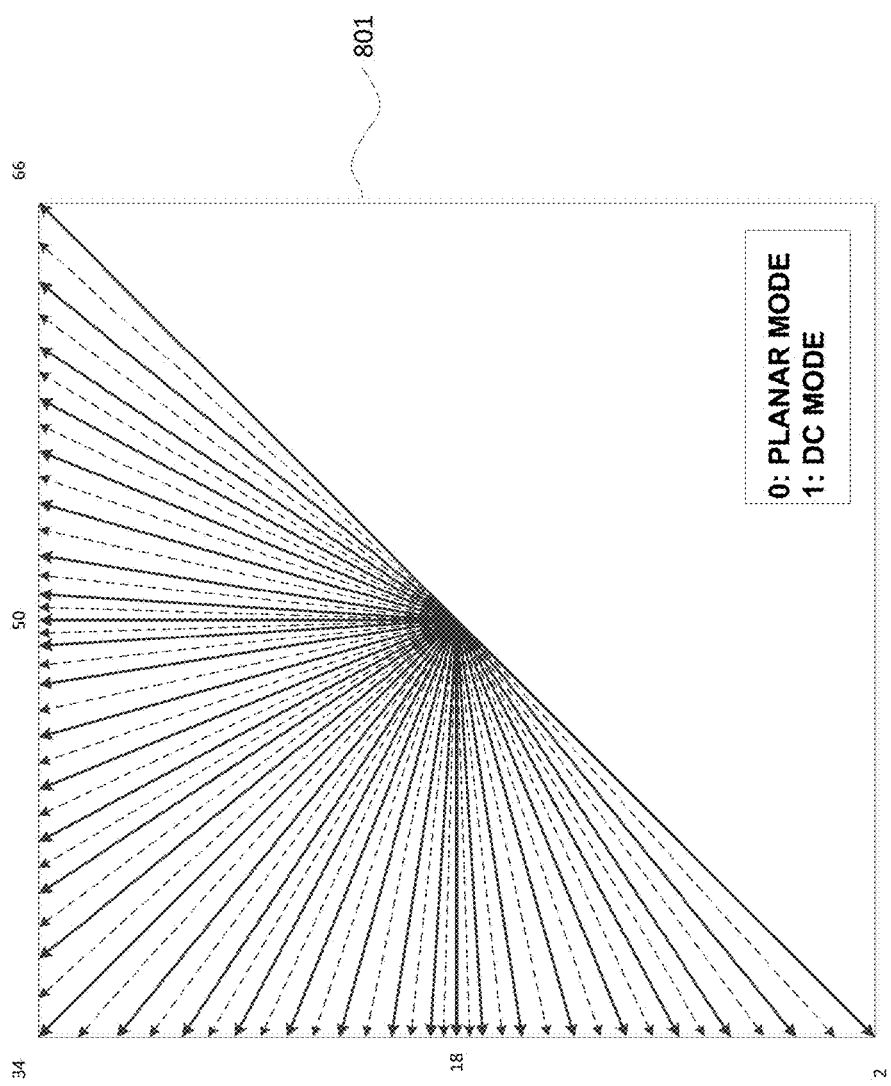
FIG. 8 shows a schematic 801 that depicts 65 intra prediction directions.

FIG. 8 shows a schematic 801 that depicts 65 intra prediction directions. In some embodiments, a total of 67 intra prediction modes are used. Among the 67 intra prediction modes, intra prediction mode 0 is planar mode, intra prediction mode 1 is DC mode, and intra prediction mode 2 to intra prediction mode 66 respectively correspond to the 65 intra prediction directions, and are referred to as directional intra prediction modes. As shown in FIG. 8, some of the directional intra prediction modes are identified by dotted arrows, and are associated with odd intra prediction mode indexes, and thus are referred to as odd intra prediction modes. The other of directional intra prediction modes are identified by solid arrows, and are associated with even intra prediction mode indexes, and thus are referred to as even intra prediction modes. In this document, the directional intra prediction modes, as indicated by solid or dotted arrows in FIG. 8 are also referred as angular modes.

In an example, a total of 67 intra prediction modes are used for luma intra prediction. In some embodiments, to code an intra prediction mode of a current block, a most probable mode (MPM) list of size 6 is built based on intra prediction modes of neighboring blocks of the current block. For example, six intra prediction modes are selected from the intra prediction modes of the neighboring blocks to form the MPM list. When the intra prediction mode of the current block is not in the MPM list, a flag is signaled to indicate whether intra prediction mode belongs to the selected intra prediction modes in the MPM list. In another example, there are 16 selected intra prediction modes in the MPM list, the 16 selected intra prediction modes are chosen uniformly as every fourth angular mode in the angular modes. In another example, 16 secondary most probable modes are derived to replace the uniformly selected intra prediction modes.

According to some aspects of the disclosure, the reference samples used for predicting the current block are not restricted to the nearest line (row or column) to the current block. In the method of multiple reference line intra prediction, the index number of candidate reference lines (row or columns) are increased from zero (i.e. the nearest) to N−1 for the intra directional modes, where N is an integer equal to or greater than one. In some examples, the nearest reference line is referred to as zero reference line, and the other reference lines are referred to as nonzero reference lines. The reference lines are also referred to as reference tiers in some examples.

Figure 9:
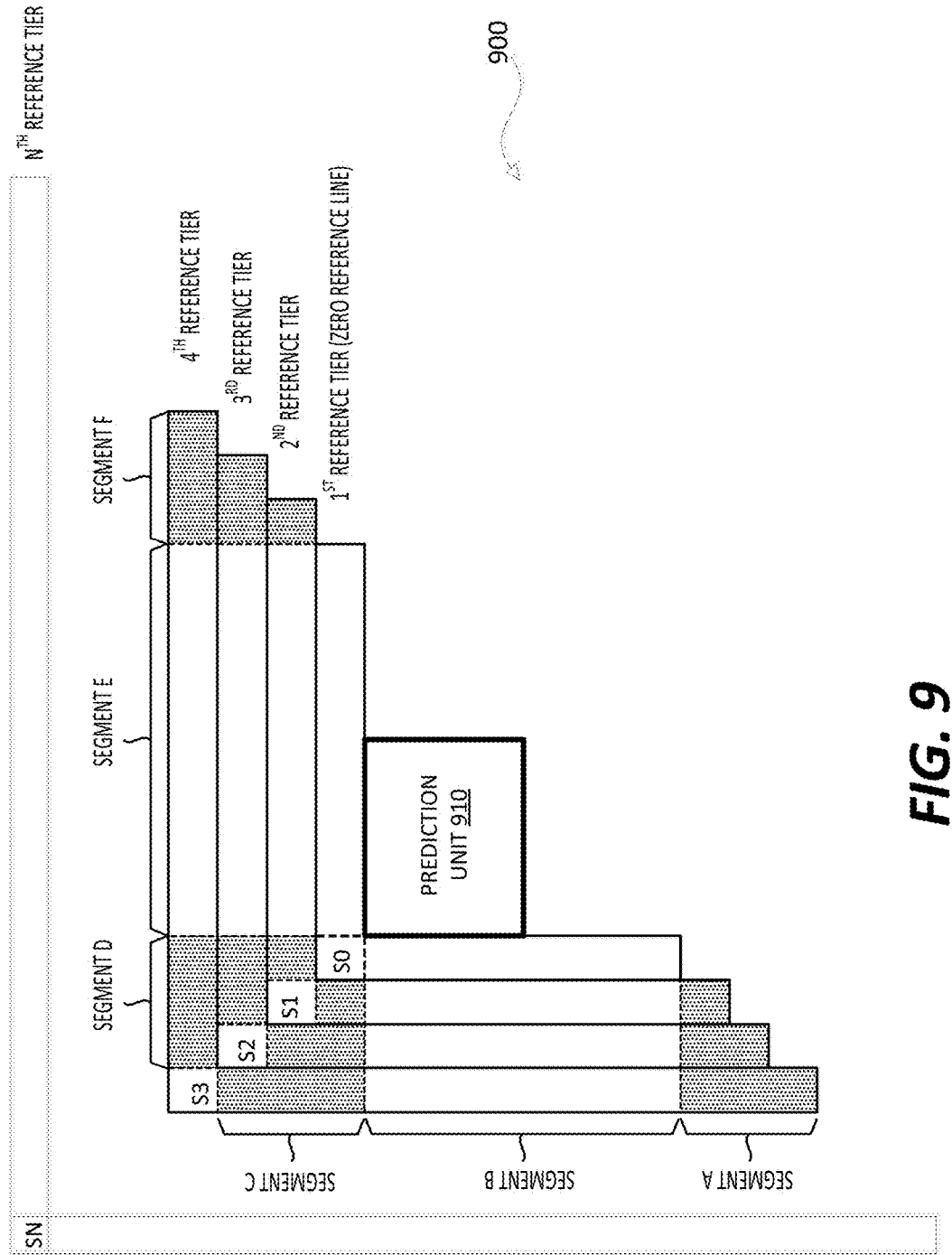
FIG. 9 shows a diagram 900 for multiple reference line intra directional prediction according to an embodiment of the disclosure.

FIG. 9 shows a diagram (900) for multiple reference line intra directional prediction according to an embodiment of the disclosure. The diagram (900) shows a prediction unit (910) (e.g., 4×4 prediction unit) with multiple reference tiers, such as N reference tiers. An intra-directional mode could arbitrarily choose one of N reference tiers to generate the predictors. In an example, the predictor p(x,y) is generated from one of, for example, the top-left reference samples S0, S1, S2, S3, . . . , SN from different reference tiers. A flag is signaled to indicate which reference tier is chosen for an intra-directional mode. If N is set as 0, the intra directional prediction method is the same as the traditional method that is restricted to the nearest line. In FIG. 9, the reference lines are composed of six segments together with the top-left reference samples. In this document, a reference tier is also called a reference line. The coordinate of the top-left pixel within current block unit is (0,0) and the top left pixel in the zero reference line is (−1,−1).

In some examples, for the luma component, the neighboring samples used for intra prediction sample generations are filtered before the generation process. The filtering is controlled by the given intra prediction mode and transform block size. In an example, when the intra prediction mode is DC or the transform block size is equal to 4×4, neighboring samples are not filtered. In another example, when the distance between the given intra prediction mode and vertical mode (or horizontal mode) is larger than predefined threshold, the filtering process is enabled. In an example, for neighboring sample filtering, [1, 2, 1] filter and bi-linear filter can be used.

In some embodiments, position dependent intra prediction combination (PDPC) technique is used in intra prediction. PDPC is an intra prediction technique that invokes a combination of the un-filtered boundary reference samples and HEVC style intra prediction with filtered boundary reference samples. In an example, each prediction sample pred[x][y] located at (x, y) is calculated as follows:

$$\text{pred}[x][y]=(wL\times R\_(-1,y)+wT\times R\_(x,-1)+wTL\times R\_(-1,-1)+(64-wL-wT-wTL)\times \text{pred}[x][y]+32)>>6 \quad \text{(Eq. 1)}$$

where R_(x,−1), R_(−1,y) represent the unfiltered reference samples located at top and left of current sample (x, y), respectively, R_(−1,−1) represents the unfiltered reference sample located at the top-left corner of the current block, and wT, wL, and wTL denote weights. The weights are calculated by Eq. 2-Eq. 5, width denotes the width of the current block, and height denotes the height of the current block:

$$wT=32>>((y<<1)>>\text{shift}) \quad \text{(Eq. 2)}$$

$$wL=32>>((x<<1)>>\text{shift}) \quad \text{(Eq. 3)}$$

$$wTL=-(wL>>4)-(wT>>4) \quad \text{(Eq. 4)}$$

$$\text{shift}=(\log 2(\text{width})+\log 2(\text{height})+2)>>2 \quad \text{(Eq. 5)}$$

Figure 10B:
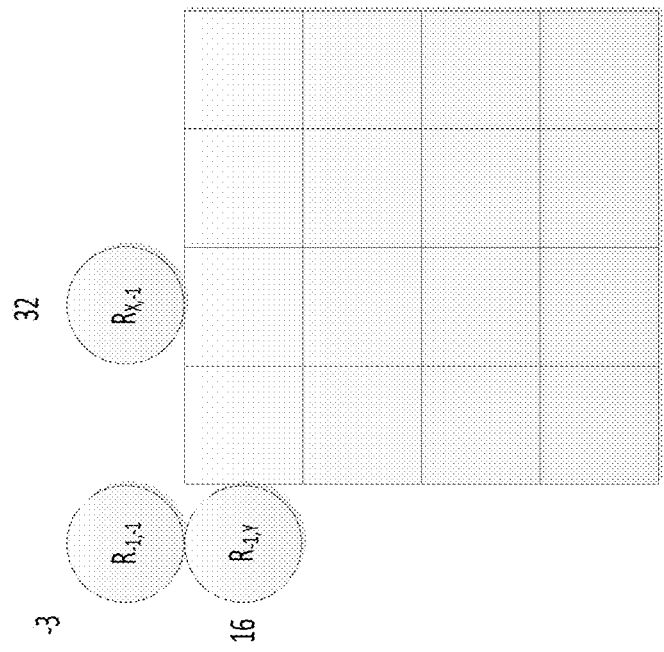
FIGS. 10A and 10B show examples of weights for predictions according to an embodiment of the disclosure.
Figure 10A:
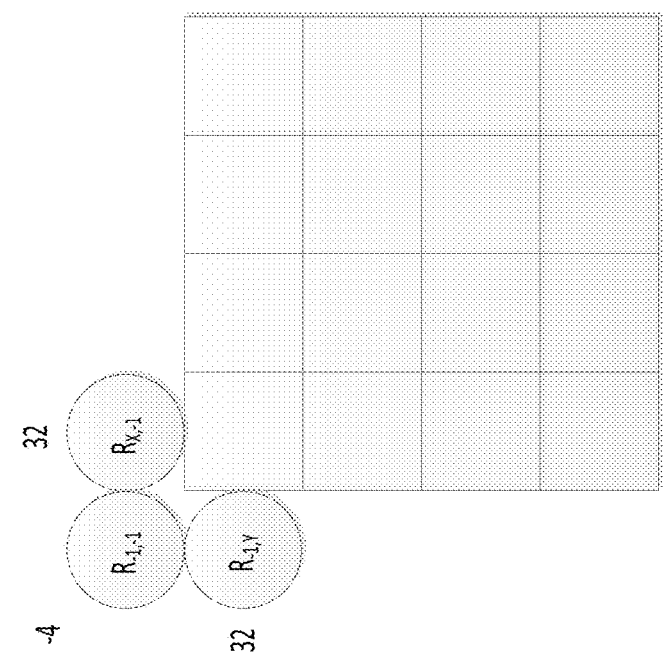

FIG. 10A shows weights for prediction sample (0, 0). In the FIG. 10A example, the current block is a 4×4 block, width is 4, height is also 4, thus shift is 1. Then, wT is 32, wL is 32, and wTL is −4.

FIG. 10B shows weights for prediction sample (1,0). In the FIG. 10B example, the current block is a 4×4 block, width is 4, height is also 4, thus shift is 1. Then, wT is 32, wL is 16, and wTL is −3.

In some examples, local illumination compensation (LIC) is used. LIC is based on a linear model for illumination changes. The linear model can be built based on a scaling factor a and an offset b. The scaling factor a and the offset b are referred to as illumination compensation (IC) parameters. LIC can be enabled or disabled adaptively for each inter-mode coded coding unit (CU).

Figure 11:
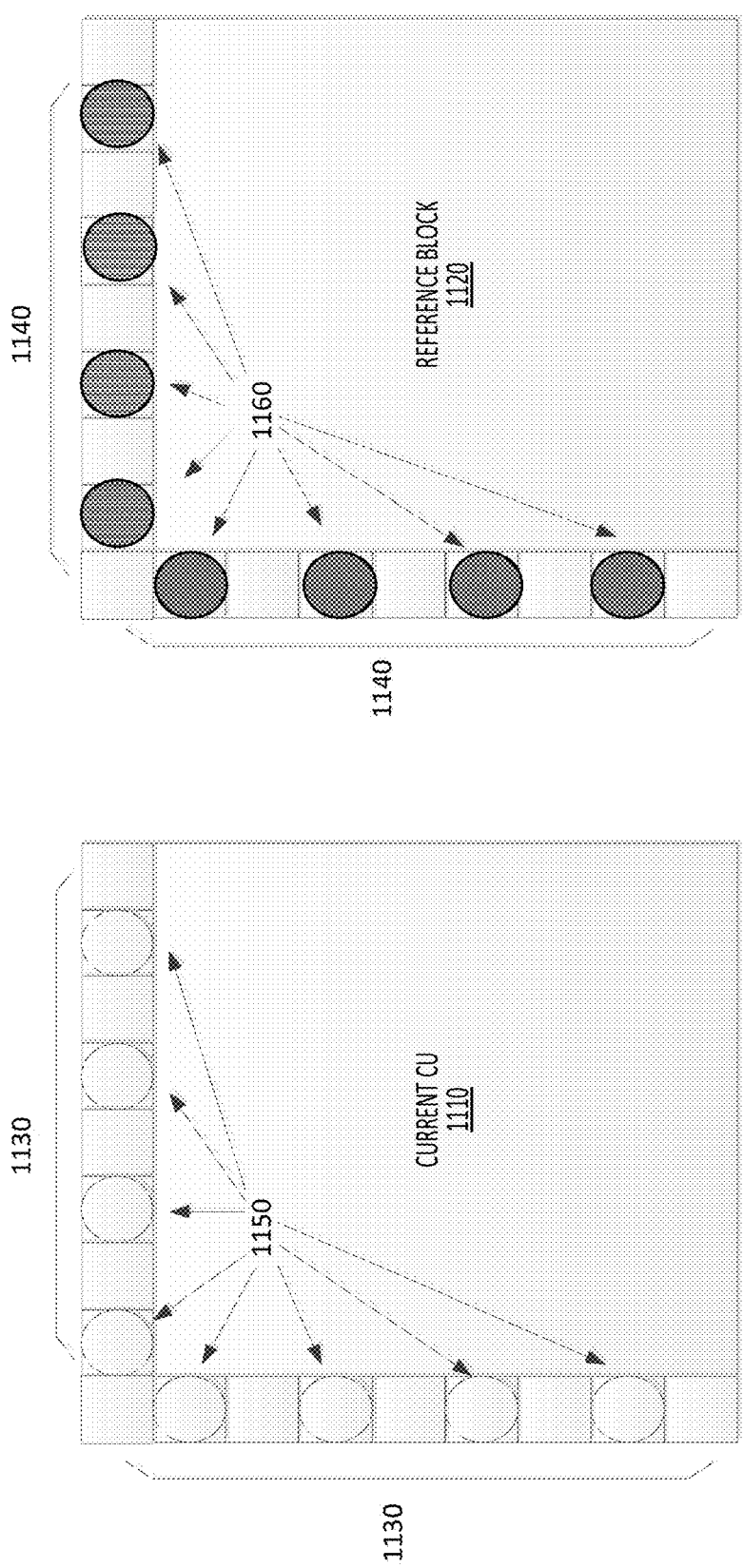
FIG. 11 shows a diagram for deriving illumination compensation (IC) parameters based on neighboring samples.

FIG. 11 shows a diagram for deriving illumination compensation (IC) parameters based on neighboring samples. FIG. 11 shows a current CU (1110) and a reference block (1120). In an example, the reference block (1120) is in a reference picture prior to a current picture having the current CU (1110). The neighboring samples for the current CU (1110) are shown as (1130), and the neighboring samples for the reference block (1120) are shown as (1140). Further in the FIG. 11, a subsampling technique is used to select a subset of neighboring samples. For example, when 2:1 subsampling is used, a subset (1150) is selected from the neighboring samples (1130) of the current CU (1110), and a corresponding subset (1160) is selected from the neighboring samples (1140) of the reference block (1120). Based on the subset (1150) and the subset (1160), a least square error method is employed to derive the IC parameters a and b.

In some embodiments, the IC parameters are derived and applied for each prediction direction separately. When a CU is coded with merge mode, the LIC flag is copied from neighboring blocks, in a way similar to motion information copy in merge mode; otherwise, an LIC flag is signaled for the CU to indicate whether LIC applies or not.

According to a first aspect of the disclosure, for multiple line intra prediction, instead of setting the same number of reference tiers for all blocks, a technique that adaptively selects the number of reference tiers for each block can be used. In this document the index of the closest reference line is denoted as 0.

In an embodiment, the block sizes of above/left block can be used to determine the number of reference tiers for the current block. For example, when the sizes of above and/or left blocks are larger than M×N, the number of reference tiers for the current block is restricted to L. The M and N can be 4, 8, 16 32, 64, 128, 256 and 512, and L can be 1~8. In an example, when M and/or N is equal to or larger than 64, L is set to 1. In another example, the ratio of the number of above candidate reference rows to the number of left candidate reference columns is the same as the ratio of block width to block height. For example, when the current block size is M×N, the number of candidate reference rows above the current block is m and the number of candidate reference columns that are left to the current block is n, then M:N=m:n.

In another embodiment, the position of last coefficients of left and above blocks can be used to determine the number of reference tiers for current block. The last coefficients refer to the last non-zero coefficients in the specified scan order for current block. For example, when the position of last coefficient is within the first M×N region for above and/or left blocks, the number of reference tiers for current block is restricted to L, (e.g. L can be 1~8), M and N can be 1~1024. In an example, when there is no coefficient in above and/or left blocks, the number of reference tiers for current block is restricted to 1. In another example, when the coefficients in the above and/or left blocks are within 2×2 top-left region, the number of reference tiers for current block is restricted to 1~2.

In another embodiment, the pixel values of reference samples in above and/or left blocks can be used to determine the number of reference tiers of current block. For example, when the difference between reference line with index Li and the reference line with index Lj (Li<Lj) is quite small (e.g., smaller than a threshold), the reference line Lj will be removed from the reference line list. Li and Lj can be 1~8. In some cases, reference lines with index number larger than 0 are all removed (zero reference line stays), because the difference between all the reference lines is quite small. The method to measure the difference between two reference lines include, but not limited to gradient, SATD, SAD, MSE, SNR and PSNR. In an example, when the average SAD of Li and Lj is less than 2, reference line Lj is removed from the reference line list. In another example, the prediction mode of above and/or left mode information can be used to determine the number of reference tiers for current block. In another example, when the prediction mode of above and/or left blocks is skip mode, the number of reference tiers for current block is restricted to L. L can be 1~8.

According to a second aspect of the disclosure, the reference line index of chroma block can be derived from luma block, both for separated tree or the same tree. Here, the index of the closest reference line is denoted as 0.

For the same tree, when the reference line index for the co-located luma block is >=2, the reference line index of current chroma block is set to 1. Otherwise, the reference line index of current chroma block is set to 0.

For the separated tree, when the chroma block just covers one block in luma component, the reference line index derivation algorithm is the same as the algorithm for the same tree. When the chroma block covers multiple blocks in luma component, the reference line index derivation algorithm can be one of the examples. In an example, for the co-located blocks in luma component, when the reference line index of majority of the blocks are less than 2, the reference line index for current chroma block is derived as 0; otherwise, the reference line index for current chroma block is derived as 1. The method to measure majority can include, but not limited to the region size of the blocks and the number of the blocks. In another example, for the co-located blocks in luma component, when the reference line index of one block is equal to or larger than 2, the reference line index for current chroma block is derived as 1; otherwise, the reference line index for current chroma block is derived as 0. In another example, for the co-located blocks in luma component, when the reference line index of majority of the blocks are less than 2, the reference line index for current chroma block is derived as 0; otherwise, the reference line index for current chroma block is derived as 1.

In another embodiment, the number of reference tiers for current chroma block is restricted according to the first aspect of the disclosure described above. After applying the restriction according to the first aspect of the disclosure, the number of reference tiers is set to LC1. Then, the derivation algorithm that derives the reference line index of chroma block from luma block is also applied to get the line index for current block LC2. Then, the minimum of LC1 and LC2 is the final reference line index for current chroma block.

According to a third aspect of the disclosure, different reference line has different number of intra prediction modes. The index of the closest reference line is denoted as 0.

In an embodiment, when 67 intra prediction modes are used for intra prediction, the zero reference line has 67 modes, the first reference line has 35 modes, the second reference line has 17 modes, the third reference line has 9 modes, and the like.

In another embodiment, nonzero reference lines share the same number of intra modes, but much less than that of the zero reference line, such as equal to or less than half of the intra prediction modes of the zero reference line.

In an example, only directional intra prediction modes with even mode indexes are allowed for nonzero reference lines. As illustrated in FIG. 8, directional intra prediction modes with odd mode indexes are marked with dashed arrow while directional intra prediction modes with even mode indexes are marked with solid arrow.

In another example, only directional intra prediction modes with even mode index and DC and Planar modes are allowed for nonzero reference lines. In another example, only most probable modes (MPM) are allowed for nonzero reference lines, including both the first level MPM and second level MPM.

In another example, since nonzero reference line is only enabled for even intra prediction modes, when coding the intra prediction modes, if a none zero index is signaled, certain intra prediction modes, such as planar mode, DC mode, and odd intra prediction modes are excluded from the MPM derivation and the MPM list, excluded from second level MPM derivation and second level MPM list, and excluded from the remaining non-MPM mode list.

In another embodiment, the reference line index is signaled after signaling of the intra prediction modes, and whether to signal the reference line index is dependent on the signaled intra prediction mode.

In an example, only directional intra prediction modes with even mode index are allowed for nonzero reference lines. When the signaled intra prediction mode is directional prediction with even mode index, the selected reference line index is signaled; otherwise, only one default reference line (zero reference line), e.g., the nearest reference line, is allowed for intra prediction and no index is signaled.

In another example, only most probable modes (MPM) are allowed for nonzero reference lines. When the signaled intra predictions are from MPMs, the selected reference line index needs to be signaled; otherwise, only one default reference line (zero reference line), e.g., the nearest reference line is allowed for intra prediction and no index is signaled.

In another example, nonzero reference lines are still enabled for all directional intra prediction modes, or all intra prediction modes, and the intra prediction mode index can be used as the context for entropy coding the reference line index.

In another embodiment, for angular intra prediction modes which have derived (not signaled) reference line index, e.g., odd directional intra prediction modes, and/or Planar/DC, multiline reference samples are used to generate the predictors for current block.

In an example, for angular intra prediction modes which have derived (not signaled) reference line index, the prediction sample value is generated using a weighted sum of multiple predictors. Each of the multiple predictors is the prediction generated using one of the multiple reference lines. For example, the weighted sum is using {3, 1} weightings applied on the predictors generated by the first reference line and second reference line, respectively. In another example, the weightings depend on the block size, block width, block height, sample position within the current block to be predicted, and/or intra prediction mode.

In another example, for a given angular prediction mode with odd index, the zero reference line is used to generate one prediction block unit $Pred_1$ and the 1st reference line is used to generate another prediction block unit $Pred_2$. Then, the final prediction value for each pixel in current block unit is the weighted sum of the two generated prediction block units. This process can be formulated by the Eq. 6, where $W_i$ is the same value for all the pixels in the same block. Same techniques can be suitably applied to different blocks regardless of intra prediction modes and block sizes or dependent on the intra prediction modes and blocks sizes.

$$Pred'(x, y) = \sum_{i=1}^{2} W_i Pred_i(x, y) \qquad \text{(Eq. 6)}$$

In another embodiment, the number of intra prediction modes for each reference line is derived by the difference between the reference samples in that reference line. The techniques to measure the difference include, but not limited to gradient, SATD, SAD, MSE, SNR and PSNR.

In an example, when both the above row and left column of the reference samples are quite similar, the number of modes can be reduced to 4, or 9, or 17 or 35 modes. In the example of using 4 modes, the four modes are planar, DC, vertical mode (same column), and horizontal mode (same row).

In another example, when only above row of the reference samples are quite similar, the modes in vertical-like prediction modes are down-sampled. In a special case, only mode 50 are kept, and modes 35~mode 49 and mode 51~mode 66 are excluded. In order to make the total intra prediction modes as 9 or 17 or 35, the intra prediction modes in horizontal-like direction is reduced accordingly.

In another example, when only left column of the reference samples are quite similar, the modes in horizontal-like direction are down-sampled. In a special case, only mode 18 are kept, and modes 2~mode 17 and mode 19~mode 33 are excluded. In order to make the total intra prediction modes as 9 or 17 or 35, the intra prediction modes in vertical-like direction is reduced accordingly.

According to a fourth aspect of the disclosure, samples in current reference line are smoothed based on the neighboring samples in the current reference line and its neighboring reference line(s).

In an embodiment, for each pixel in current reference line, all pixels in reference lines 1 to L can be used to smooth the pixels in current line. L is the max allowed reference line number for intra prediction, and L can be 1 to 8.

In an example, for each pixel in the reference line except the boundary pixels, K×L filter is used to smooth each pixel. For the boundary pixels, 1×L filter is used to smooth that pixel. K can be 3, 5, or 7.

The boundary pixels can be filtered or not filtered. When the boundary pixels are filtered, each boundary pixel in the same reference line uses the same filter. Boundary pixels in the different reference lines can use different filters. For example, the boundary pixels in the zero reference line can be filtered by [3, 2, 2, 1] filter, the boundary pixels in 1st reference line can be filtered by [2, 3, 2, 1] filter, the boundary pixels in 2nd reference line can be filtered by [1, 2, 3, 2] filter, the boundary pixels in 3rd reference line can be filtered by [1, 2, 2, 3] filter.

In another example, for the other pixels, the pixels in each reference line can use the same filter, and the pixels in different reference lines can use different filters. Alternatively, for the other pixels, the pixels in different position can use different filters. In an example, the filters are pre-defined, and the encoder does not need to signal the index of the filter.

In another example, the filtering operation for each reference line can be intra prediction mode and transform size dependent. The filtering operation is enabled only when the intra prediction mode and transform size satisfies certain condition. For example, the filtering operation is disabled when the transform size is equal to 4×4 or smaller.

In another example, rather than rectangular shape, the filter used to smooth each pixel may have an irregular filter support shape. The filter support shape may be pre-defined, and the filter support shape may depend on any information that is available to both encoder and decoder, including but not limited to: reference line index, intra mode, block height and/or width.

In another embodiment, for each pixel in zero reference line, the pixels in zero reference line and 1st reference line can be used to smooth that pixel. For each pixel in 1st reference line, the pixels in zero reference line, $1^{st}$ reference line, and $2^{nd}$ reference line can be used to smooth that pixel. For each pixel in 2nd reference line, the pixels in 1st reference line, 2nd reference line, and 3rd reference line can be used to smooth that pixel. For each pixel in 3rd reference line, the pixels in $2^{nd}$ reference line and $4^{th}$ reference line can be used to smooth that pixel. In other words, when four reference lines are used, pixels in the zero reference line and 3rd reference line are filtered based on the pixels in two reference lines, and for pixels in 1st reference line and 2nd reference line, pixels in 3 reference lines are used to filter each pixel.

For example, the filtered pixels in 1st reference line and 2nd reference line can be computed by one of Eq. 7 to Eq. 10, the filtered pixels in zero reference line can be computed by one of Eq. 11~Eq. 15, and the filtered pixels in 3rd reference line can be computed from Eq. 16~Eq. 20. In addition, rounding, such as rounding to zero, rounding to positive infinity or rounding to negative infinity, and the like may be applied to the filtering calculations.

$$p'(x, y) = (p(x-1, y) + p(x, y-1) + p(x, y+1) + p(x+1, y) + 4 \times p(x, y)) \gg 3 \qquad \text{(Eq. 7)}$$

$$p'(x, y) = (p(x, y+1) - p(x, y-1) + p(x, y)) \qquad \text{(Eq. 8)}$$

$$p'(x, y) = \qquad \text{(Eq. 9)}$$
$$(p(x-1, y) + p(x-1, y-1) + p(x-1, y+1) + p(x, y-1) + p(x, y+1) + p(x+1, y-1) + p(x+1, y) + p(x+1, y+1) + 8 \times p(x, y)) \gg 4$$

$$p'(x, y) = \qquad \text{(Eq. 10)}$$
$$(w_1 \times p(x-1, y) + w_2 \times p(x-1, y-1) + w_3 \times p(x-1, y+1) + w_4 \times p(x, y-1) + w_5 \times p(x, y+1) + w_6 \times p(x+1, y-1) + w_7 \times p(x+1, y) + w_8 \times p(x+1, y+1) + w_8 \times p(x, y)) / \left(\sum_{i=1}^{9} w_i\right)$$

$$p'(x, y) = \qquad \text{(Eq. 11)}$$
$$(p(x-1, y) + p(x, y-1) + p(x+1, y) + 5 * p(x, y)) \gg 3$$

$$p'(x, y) = (p(x-1, y) + p(x, y-1) + p(x+1, y) + p(x, y)) \gg 2 \qquad \text{(Eq. 12)}$$

$$p'(x, y) = (2p(x, y) - p(x, y-1)) \qquad \text{(Eq. 13)}$$

$$p'(x,y) = \qquad \text{(Eq. 14)}$$
$$(p(x-1, y) + p(x-1, y-1) + p(x, y-1) + p(x+1, y-1) + p(x+1, y) + 3 * p(x, y)) \gg 3$$

$$p'(x, y) = \qquad \text{(Eq. 15)}$$
$$(w_1 * p(x-1, y) + w_2 * p(x-1, y-1) + w_3 * p(x, y-1) + w_4 * p(x+1, y-1) + w_5 * p(x+1, y) + w_6 * p(x, y)) / \left(\sum_{i=1}^{6} w_i\right)$$

$$p'(x, y) = \qquad \text{(Eq. 16)}$$
$$(p(x-1, y) + p(x, y+1) + p(x+1, y) + 5 * p(x, y)) \gg 3$$

$$p'(x, y) = (p(x-1, y) + p(x, y+1) + p(x+1, y) + p(x, y)) \gg 2 \qquad \text{(Eq. 17)}$$

$$p'(x, y) = (2p(x, y) - p(x, y+1)) \qquad \text{(Eq. 18)}$$

$$p'(x, y) = \qquad \text{(Eq. 19)}$$
$$(p(x-1, y) + p(x-1, y+1) + p(x, y+1) + p(x+1, y+1) + p(x+1, y) + 3 * p(x, y)) \gg 3$$

$$p'(x, y) = \quad\quad\quad\quad\quad\quad\quad\quad\quad\quad\quad\quad\quad\quad\quad\text{(Eq. 20)}$$
$$(w_1 * p(x-1, y) + w_2 * p(x-1, y+1) + w_3 * p(x, y+1) +$$
$$w_4 * p(x+1, y+1) + w_5 * p(x+1, y) +$$
$$w_6 * p(x, y)) \Big/ \left(\sum_{i=1}^{6} w_i\right)$$

According to a fifth aspect of the disclosure, in the current block, samples in different positions may use different combinations of reference samples with different line indexes to predict.

In an embodiment, for a given intra prediction mode, each reference line i can generate one prediction block $Pred_i$. For the pixels at different positions of the current block, different combinations of the generated prediction block $Pred_i$ can be used to calculate the pixels at the different positions to generate the final prediction block. To be specific, for the pixel at position (x,y), Eq. 21 can be used to calculate the prediction value.

$$Pred'(x, y) = \sum_{i=0}^{N} W_i Pred_i(x, y) \quad\quad\quad\quad\text{(Eq. 21)}$$

where $W_i$ denotes weight for the prediction block $Pred_i$ and is position dependent. In other words, the weighting factors are the same for the same position, and the weighting factors are different for the different positions.

In another embodiment, given an intra prediction mode, for each sample, a set of reference samples from multiple reference lines are selected, and a weighted sum of these selected set of reference samples is calculated as the final prediction value. The selection of reference samples may depend on intra mode and position of prediction sample, and the weightings may depend on intra mode and position of prediction sample.

In another embodiment, when using Kth reference line (K is positive integer) for intra prediction, for each sample, the prediction values by the zero reference line and the Kth reference line are compared, and when prediction value by the Kth reference line is very different from the prediction value by the zero reference line (e.g., larger than a threshold), then the prediction value from Kth reference line is excluded, and the zero reference line may be used instead. The technique to measure the difference between prediction value of current position and that of its neighboring positions include, but not limited to gradient, SATD, SAD, MSE, SNR and PSNR. In an example, more than 2 prediction values are generated from different reference lines, and the median (or average, or most frequently appeared) value is used as the prediction of the sample.

In another embodiment, when using Kth reference line for intra prediction, for each sample, the prediction values of the zero reference line and the Kth reference line are compared, and if line 1 generate very different prediction value, then the prediction value from line x is excluded, and line 1 may be used instead. The way to measure the difference between prediction value of current position and that of its neighboring positions include, but not limited to gradient, SATD, SAD, MSE, SNR and PSNR.

According to a sixth aspect of the disclosure, after intra prediction, instead of only using the pixels in the nearest reference line, the pixels in multiple reference lines are used to filter the prediction value of each block. For example, PDPC is extended for multiple line intra prediction. Each prediction sample pred[x][y] located at (x, y) is calculated as Eq. 22:

$$pred[x][y] = \left(\sum_{i=m}^{-1} wL_i * R_{i,y} + \sum_{i=m}^{-1} wT_i * R_{x,i} + \sum_{i=m}^{-1} wTL_i * TL_{i,i} + \right. \quad\text{(Eq. 22)}$$
$$\left.\left(64 - \sum_{i=m}^{-1} wL_i - \sum_{i=m}^{-1} wT_i - \sum_{i=m}^{-1} wTL_i\right) * pred[x][y] + 32\right) \gg 6$$

where m can be −8 to −2.

In an example, reference samples in the nearest 2 lines are used to filter the samples in current block. For top-left pixel, only the top-left sample in the first row are used, such as shown in Eq. 23:

$$pred[x][y] = \left(\sum_{i=-2}^{-1} wL_i * R_{i,y} + \sum_{i=-2}^{-1} wT_i * R_{x,i} + wTL_{-1} * TL_{-1,-1} + \right. \quad\text{Eq. 23}$$
$$\left.\left(64 - \sum_{i=-2}^{-1} wL_i - \sum_{i=-2}^{-1} wT_i - wTL_{-1}\right) * pred[x][y] + 32\right) \gg 6$$

In another example, boundary filters can be extended to multiple reference lines. For example, after DC prediction, the pixels in the first several columns and the first several rows are filtered by the neighboring reference pixels. The pixels in the first column can be filtered using Eq. 24, the pixels in the first row can be filter suing Eq. 25, $$p'(x, y) = \left(\sum_{i=m}^{-1} wL_i * R_{i,y} + \left(64 - \sum_{i=m}^{-1} wL_i\right) * p(x, y)\right) \gg 6 \quad\text{(Eq. 24)}$$

$$p'(x, y) = \left(\sum_{i=m}^{-1} wT_i * R_{x,i} + \left(64 - \sum_{i=m}^{-1} wT_i\right) * p(x, y)\right) \gg 6 \quad\text{(Eq. 25)}$$

In some special case, the pixels in the first column can be filtered using Eq. 26, the pixels in the first row can be filter using Eq. 27:

$$p'(0,y) = p(0,y) + R_{-1,y} - R_{-2,y}, \quad\quad\quad\quad\text{(Eq. 26)}$$

$$p'(x,0) = p(x,0) + R_{x,-1} - R_{x,-2} \quad\quad\quad\quad\text{(Eq. 27)}$$

In another example, after vertical prediction, the pixels in the first several columns can be filtered using Eq. 28; and after horizontal prediction, the pixels in the first several rows can be filtered using Eq. 29:

$$p'(x, y) = \sum_{i=m}^{-1} wL_i * (R_{i,y} - R_{i,i}) + p(x, y) \quad\quad\text{(Eq. 28)}$$

$$p'(x, y) = \sum_{i=m}^{-1} wT_i * (R_{x,i} - R_{i,i}) + p(x, y) \quad\quad\text{(Eq. 29)}$$

In another example, for vertical/horizontal prediction, when a nonzero reference line is used to generate the prediction sample, the zero reference line and the corresponding pixel in the nonzero reference line is used for boundary filtering.

Figure 12:
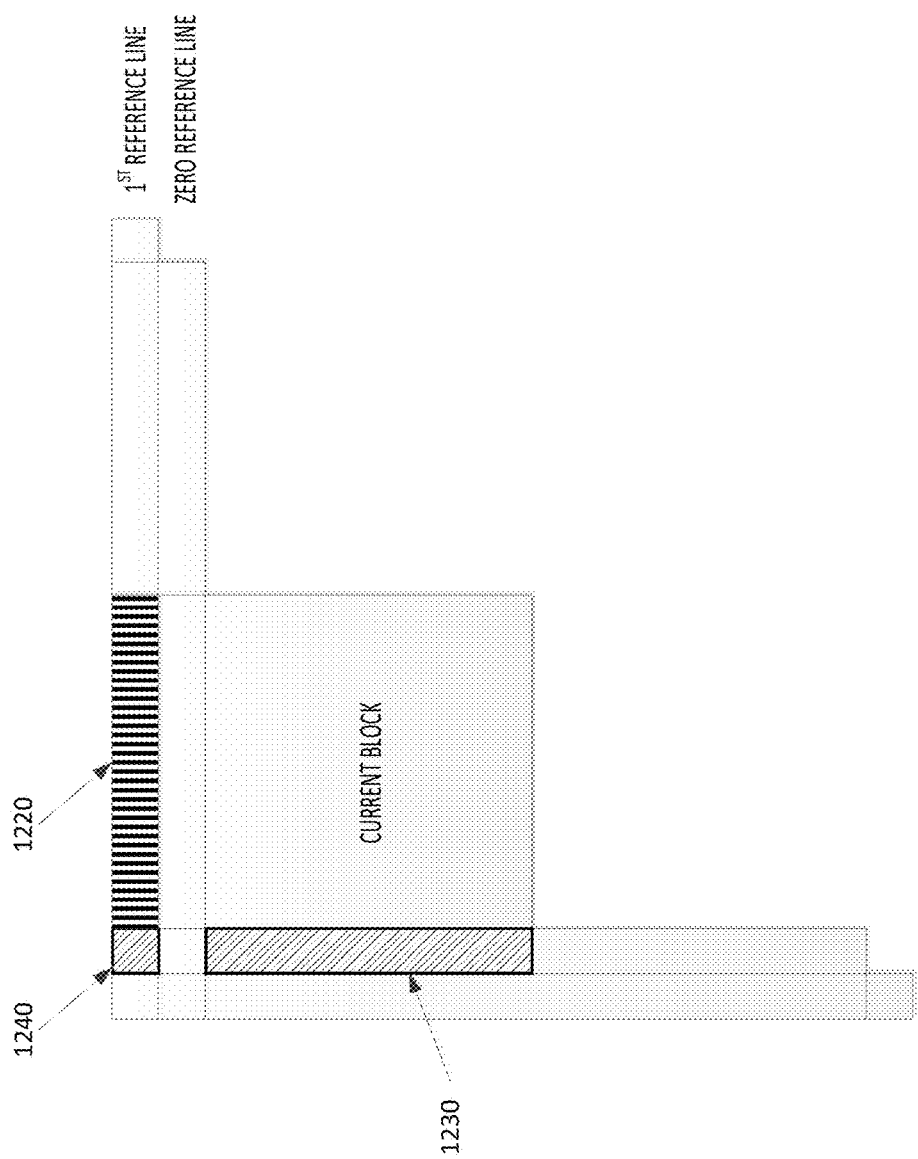
FIG. 12 shows a diagram illustrating boundary filtering for vertical prediction according to an embodiment of the disclosure.

FIG. 12 shows a diagram illustrating boundary filtering for vertical prediction according to an embodiment of the disclosure. In FIG. 12, $1^{st}$ reference line is used to generate the prediction sample for current block and the pixels in vertical direction (shown as 1220) are used for vertical prediction. After the vertical prediction, the pixels with diagonal texture in the zero reference line (shown as 1230) and the pixel with diagonal texture in the $1^{st}$ reference line (shown as 1240) are used to filter the first several columns in current block. The filtering process after the vertical prediction can be formulated by Eq. 30, where m denotes the selected reference line index, and m can be 2~8. n is the number of right shift bits, and can be 1~8. For horizontal prediction, the filtering process can be formulated by Eq. 31.

$$p'(x,y)=p(x,y)+(p(-1,y)-p(-1,-m))>>n \qquad \text{(Eq. 30)}$$

$$p'(x,y)=p(x,y)+(p(x,-1)-p(-m,-1))>>n \qquad \text{(Eq. 31)}$$

In another embodiment, when a nonzero reference line is used, after diagonal predictions, such as mode 2 and mode 66 in FIG. 8, pixels along the diagonal direction from the zero reference line to the nonzero reference line are used for filtering the pixels in the first several columns/rows of current block. To be specific, after mode 2 prediction, the pixels in the first several rows can be filtered using Eq. 32. After mode 66 prediction, the pixels in the first several columns can be filtered using Eq. 33. m denotes the nonzero reference line index for current block, and it can be 2~8. n is the number of right shift bits, it can be 2~8. $W_i$ is the weighting coefficients, and is an integer.

$$p'^{(x,y)} = \left(\sum_{i=1}^{m} W_i R(x+i, -i) + \left(2^n - \sum_{i=1}^{m} W_i\right) * p(x, y) + 2^{n-1}\right) >> n \qquad \text{(Eq. 32)}$$

$$p'^{(x,y)} = \left(\sum_{i=1}^{m} W_i R(-i, y+i) + \left(2^n - \sum_{i=1}^{m} W_i\right) * p(x, y) + 2^{n-1}\right) >> n \qquad \text{(Eq. 33)}$$

According to a seventh aspect of the disclosure, for multiple reference line intra prediction, modified DC and planar modes are added for nonzero reference line. In an embodiment, for the planar mode, when a different reference line is used, different pre-defined top-right and bottom-left reference samples are used to generate the prediction samples. In another embodiment, when a different reference line is used, different intra smoothing filter is used.

In an embodiment, for DC mode, for the zero reference line, all the pixels in the above row and the left column are used to calculate the DC value. For the nonzero reference line, only some of the pixels are used to calculate the DC value. For example, above pixels in the zero reference line are used to calculate the DC values for 1st reference line, left pixels in the zero reference line are used to calculate the DC values for 2nd reference line, half of left pixels and half of the above pixels in zero reference line are used to calculate the DC values for the 3rd reference line. In another embodiment, for DC mode, all reference pixels in all available candidate lines (rows and columns) are used to calculate the DC predictor.

According to an eighth aspect of the disclosure, techniques for multiple reference line can be extended to the IC mode. In an embodiment, the IC parameters are calculated using multiple above/left reference lines. In another embodiment, the reference line that is used to calculate IC parameters can be signaled.

According to a ninth aspect of the disclosure, the index of the reference line is signaled. In an embodiment, the reference line index is signaled using variable length coding. The closer to the current block in distance, the shorter the codeword. For example, if the reference line index is 0, 1, 2, 3, with 0 being the closest to the current block and 3 the furthest, the codewords for them are 1, 01, 001, 000, where 0 and 1 can be alternated.

In another embodiment, the reference line index is signaled using fixed length coding. For example, if the reference line index is 0, 1, 2, 3, with 0 being the closest to the current block and 3 the furthest, the codewords for them are 10, 01, 11, 00, where 0 and 1 can be alternated and the order may be altered.

In another embodiment, the reference line index is signaled using variable length coding, where the order of the indices in the codeword table (from the shortest codeword to the longest) is as follows: 0, 2, 4, . . . 2k, 1, 3, 5, . . . 2k+1 (or 2k−1). Index 0 indicates the reference line which is the closest to the current block and 2k+1 the furthest.

In yet another embodiment, the reference line index is signaled using variable length coding, where the order of the indices in the codeword table (from the shortest codeword to the longest) is as follows: the closest, the furthest, $2^{nd}$ closest, $2^{nd}$ furthest, . . . and so on. In one specific example, if the reference line index is 0, 1, 2, 3, with 0 being the closest to the current block and 3 the furthest, the codewords for them are 0 for index 0, 10 for index 3, 110 for index 2, 111 for index 1. The codewords for reference line index 1 and 2 may be switched. The 0 and 1 in codewords may be altered.

According to a tenth aspect of the disclosure, when the number of above reference lines (rows) is different from the number of left reference lines (columns), the index of the reference line is signaled. In an embodiment, if the number of above reference lines (rows) is M and the number of left reference lines (columns) is N, then the reference line indices for max (M, N) may use any of the signaling techniques described above, or their combinations. The reference line indices for min(M, N) take a subset of the codewords from the codewords used for indicating reference line indices for max(M, N), usually the shorter ones. For example, if M=4, N=2, and the codewords used to signal M (4) reference line indices {0, 1, 2, 3} are 1, 01, 001, 000, then the codewords used to signal N (2) reference line indices {0, 1} are 1, 01.

In another embodiment, if the number of above reference lines (rows) is M and the number of left reference lines (columns) is N, and if M and N are different, then the reference line indices for signaling above reference line (row) index and left reference line (column) index may be separate and independently use any signaling technique described above or their combinations.

According to an eleventh aspect of the disclosure, the maximum number of reference lines that may be used for intra prediction may be constrained to be no more than the number of reference lines used in other coding tools, such as deblocking filter or template matching based intra prediction, in order to potentially save the pixel line buffer.

According to a twelfth aspect of the disclosure, the multiple line intra prediction and other coding tools/modes may interact. In an embodiment, the usage and/or signaling of other syntax elements/coding tools/modes, including but not limited to: cbf, last position, transform skip, transform type, secondary transform index, primary transform index, PDPC index, may depend on the multi-line reference line index. In one example, when multi-line reference index is nonzero, transform skip is not used, and transform skip flag is not signaled. In another example, the context used for signaling other coding tools, e.g., transform skip, cbf, primary transform index, secondary transform index, may depend on the value of multi-line reference index.

In another embodiment, the multi-line reference index may be signaled after other syntax elements, including but not limited to: cbf, last position, transform skip, transform type, secondary transform index, primary transform index, PDPC index, and the usage and/or signaling of multi-line reference index may depend on other syntax elements.

According to a thirteenth aspect of the disclosure, the reference line index can be used as the context for entropy coding another syntax element, including, but not limited to intra prediction mode, MPM index, primary transform index, secondary transform index, transform skip flag, coding block flag (CBF) and transform coefficients, or vice versa.

According to a fourteenth aspect of the disclosure, the reference line information can be included into the MPM list. When the prediction mode of current block is the same as one candidate in MPM list, both of the intra prediction and the selected reference line of the selected candidate are applied for current block, and the intra prediction mode and reference line index are not signaled. In addition, the number of the MPM candidates for different reference line indexes are predefined.

In one embodiment, the number of MPMs for each reference line index is predefined and can be signaled as a higher level syntax element, such as in sequence parameter set (SPS), picture parameter set (PPS), slice header, Tile header, coding tree unit (CTU) header, or as a common syntax element or parameter for a region of a picture. As a result, the length of MPM list can be different in different sequences, pictures, slices, Tiles, group of coding blocks or a region of a picture. For example, the number of MPMs for the zero reference line is 6, and the number of MPMs with each of other reference line indices is 2. As a result, if the total reference line number is 4, the total number of MPM list is 12.

In another embodiment, all intra prediction modes together with their reference line index in the above, left, top-left, to-right, and bottom-left block are included into the MPM list.

Figure 13:
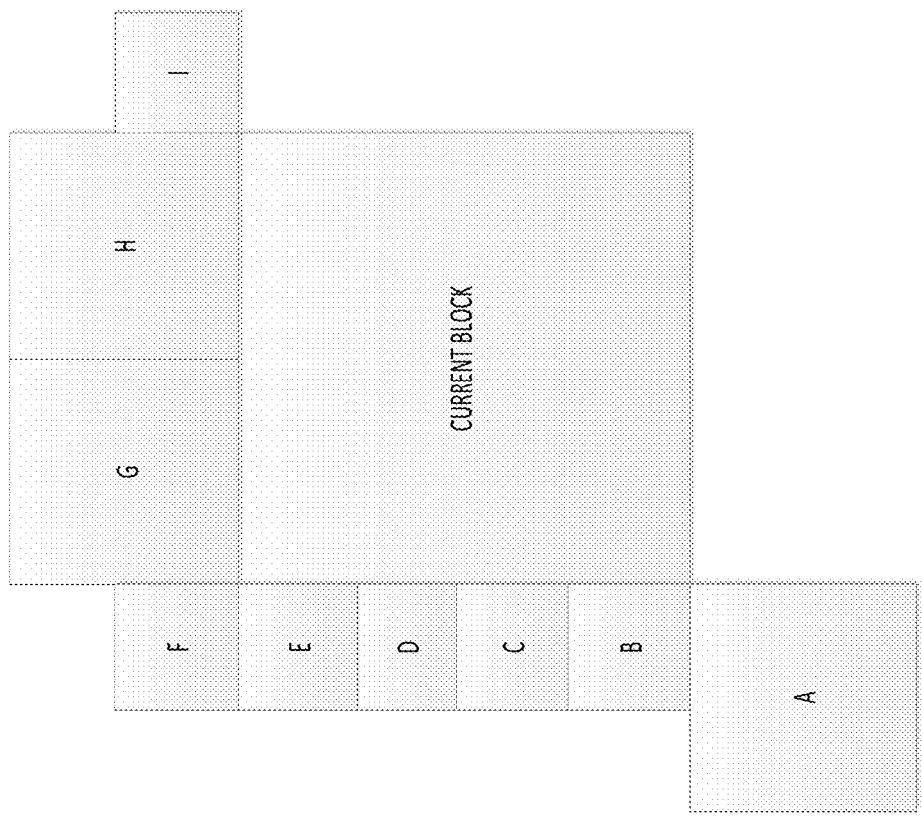
FIG. 13 shows a diagram of neighboring blocks of a current block according to an example.

FIG. 13 shows a diagram of neighboring blocks of a current block according to an example. As illustrated in FIG. 13, A is bottom-left block, B, C, D, and E are left blocks, F is top-left block, G and H are top blocks, and I is top-right block. After adding modes of the neighboring blocks into MPM list, if the number of MPM candidate with given reference line number is less than the predefined number, default modes are used to fill the MPM list.

In one example, for MPM candidate with the zero reference line, Planar, DC, Vertical, Horizontal, Mode 2 (diagonal mode), and Mode 66 (diagonal mode) are added into MPM list in this order until the length of MPM candidate with the zero reference line reaches the predefined number. For MPM candidate with other reference line index, Vertical and Horizontal Modes are added into MPM list in this order.

In another embodiment, when the mode of current block is equal to one of the candidate in MPM list, the reference line index is not signaled. If the mode of current block is not equal to any candidate in MPM list, reference line index is signaled. In one example, when the zero reference line is used for current block, the second level MPM mode is still used, but the second level MPM only includes the intra prediction mode information. In another example, for nonzero reference lines, the second level MPM is not used, and fixed length coding is used to code the remaining mode.

Figure 14:
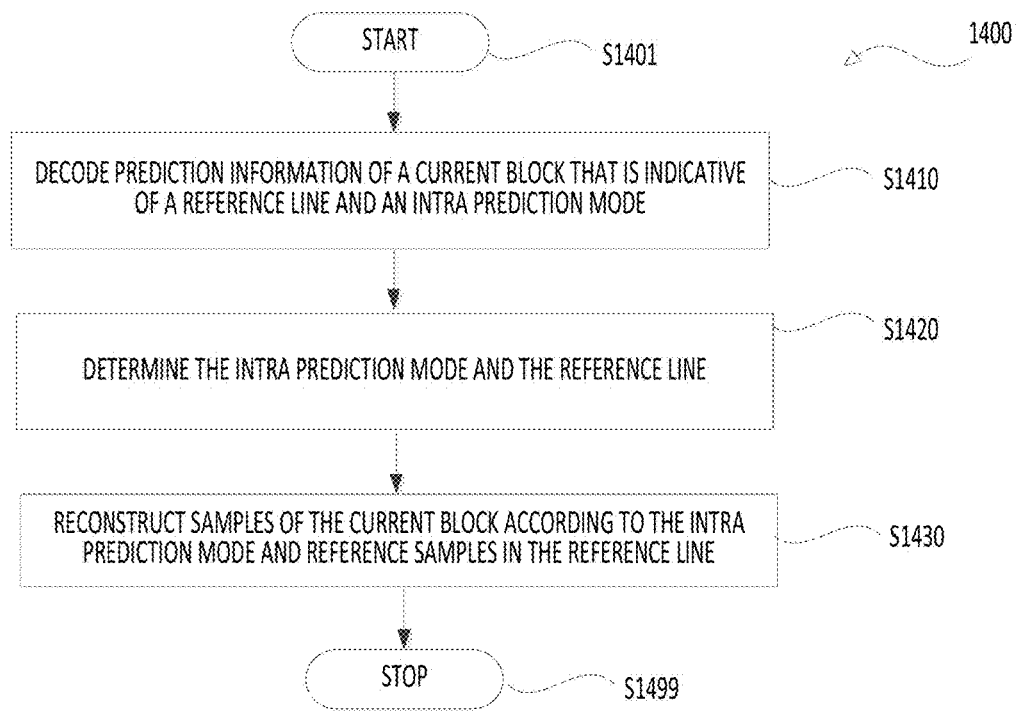
FIG. 14 shows a flow chart outlining a process example according to an embodiment of the disclosure.

FIG. 14 shows a flow chart outlining a process (1400) according to an embodiment of the disclosure. The process (1400) can be used in the reconstruction of a block coded in intra mode, so to generate a prediction block for the block under reconstruction. In various embodiments, the process (1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of a block is decoded from a coded video bitstream. The prediction information is indicative of an intra prediction mode and a reference line. The reference line is selected from a plurality of potential reference lines. The intra prediction mode is selected from a set of potential intra prediction modes that is associated with the reference line. Different reference lines have different sets of potential intra prediction modes that are respectively associated with the different reference lines.

At (S1420), determine the intra prediction mode and the reference line.

At (S1430), samples of the block are constructed according to the intra prediction mode and reference samples in the reference line. Then the process proceeds to (S1499) and terminates.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
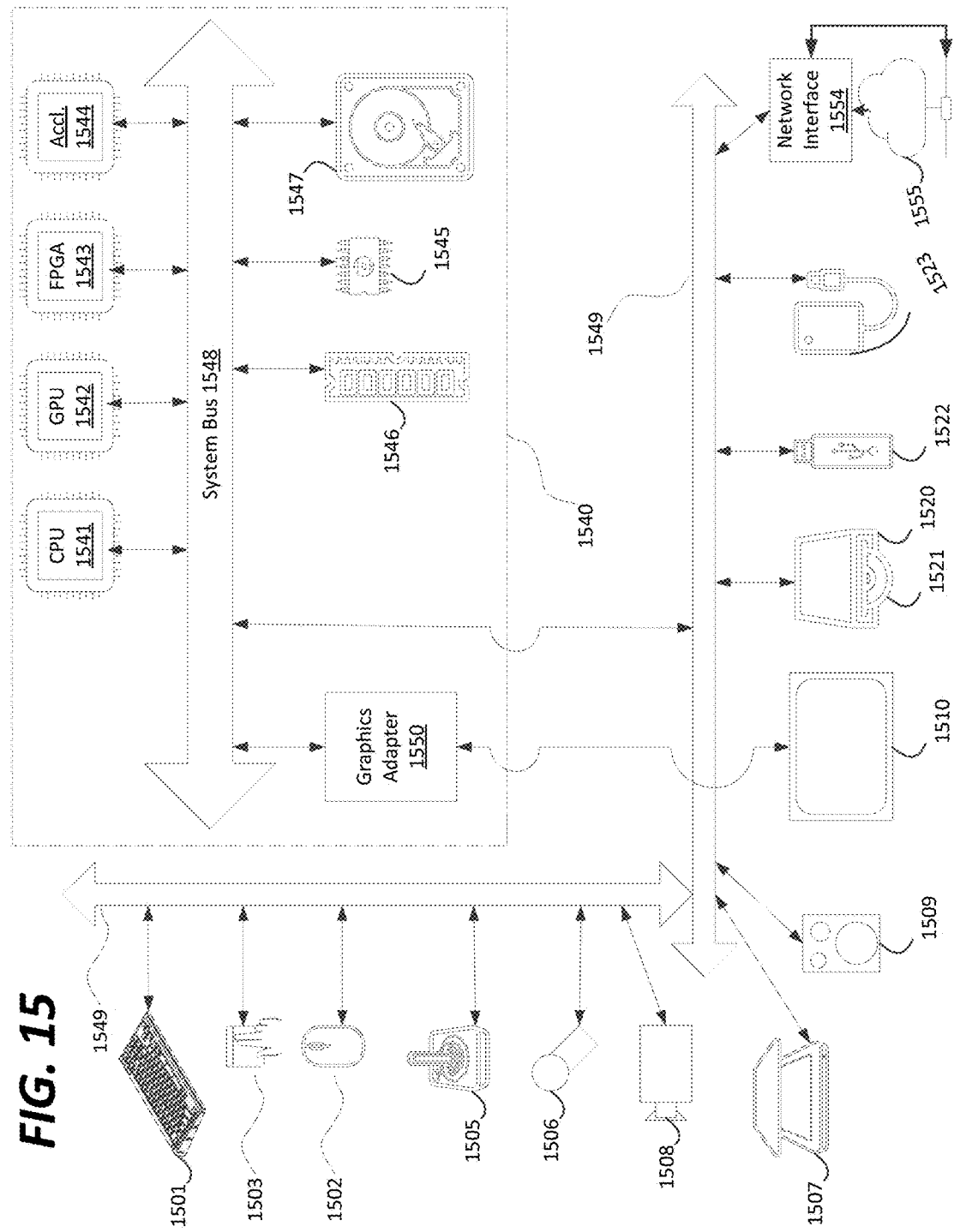
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
    decoding prediction information of a block from a coded video bitstream, the prediction information being indicative of a reference line selected from a plurality of potential reference lines and an intra prediction mode selected from a set of potential intra prediction modes that is associated with the reference line; and
    reconstructing at least one sample of the block according to the intra prediction mode and at least one reference sample in the reference line, wherein
    the prediction information is indicative of a non-zero reference line and a first set of potential intra prediction modes associated with the non-zero reference line has a smaller number of potential intra prediction modes compared to a second set of potential intra prediction modes associated with a zero reference line, and
    the first set of potential intra prediction modes lacks adjacent directional intra prediction modes.

2. The method of claim 1, wherein the first set of potential intra prediction modes comprises directional intra prediction modes with even mode indexes.

3. The method of claim 2, wherein the first set of potential intra prediction modes comprises DC and planar modes.

4. The method of claim 1, wherein the first set of potential intra prediction modes lacks directional ultra prediction modes with odd mode indexes.

5. The method of claim 1, wherein the first set of potential intra prediction modes comprises only most probable modes.

6. The method of claim 5, wherein the first set of potential intra prediction modes comprises the most probable modes that are derived from directional intra prediction modes with even mode indexes.

7. The method of claim 1, wherein decoding the prediction information of the block from the coded video bitstream further comprises:
    decoding a first signal that is indicative of the intra prediction mode; and
    selectively decoding a second signal for the reference line based on the intra prediction mode.

8. The method of claim 7, further comprising:
    decoding the second signal that is received after the first signal to determine the reference line when the intra prediction mode is a directional intra prediction mode with an even mode index; and
    determining the reference line to be a default reference line when the intra prediction mode is one of a directional intra prediction mode with an odd mode index, a planar mode and a DC mode.

9. The method of claim 7, further comprising:
    decoding the second signal that is received after the first signal to determine the reference line when the intra prediction mode is one of most probable modes; and
    determining the reference line to be a default reference line when the intra prediction mode is not one of the most probable modes.

10. An apparatus for video decoding, comprising:
    processing circuitry configured to:
        decode prediction information of a block from a coded video bitstream, the prediction information being indicative of a reference line selected from a plurality of potential reference lines and an intra prediction mode selected from a set of potential intra prediction modes that is associated with the reference line; and
        reconstruct at least one sample of the block according to the intra prediction mode and at least one reference sample in the reference line, wherein
    the prediction information is indicative of a non-zero reference line and a first set of potential intra prediction modes associated with the non-zero reference line has a smaller number of potential intra prediction modes compared to a second set of potential intra prediction modes associated with a zero reference line, and the first set of potential intra prediction modes lacks adjacent directional intra prediction modes.

11. The apparatus of claim 10, wherein the first set of potential intra prediction modes comprises directional intra prediction modes with even mode indexes.

12. The apparatus of claim 11, wherein the first set of potential intra prediction modes comprises DC and planar modes.

13. The apparatus of claim 10, wherein the first set of potential intra prediction modes lacks directional intra prediction modes with odd mode indexes.

14. The apparatus of claim 10, wherein the first set of potential intra prediction modes comprises only most probable modes.

15. The apparatus of claim 14, wherein the first set of potential intra prediction modes comprises the most probable modes that are derived from directional intra prediction modes with even mode indexes.

16. The apparatus of claim 10, wherein decoding the prediction information of the block from the coded video bitstream further comprises:

decoding a first signal that is indicative of the intra prediction mode; and selectively decoding a second signal for the reference line based on the intra prediction mode.

17. The apparatus of claim 16, further comprising:

decoding the second signal that is received after the first signal to determine the reference line when the intra prediction mode is a directional intra prediction mode with an even mode index; and determining the reference line to be a default reference line when the intra prediction mode is one of a directional intra prediction mode with an odd mode index, a planar mode and a DC mode.

18. A non-transitory computer-readable medium storing instructions which when executed by a computer for video decoding cause the computer to perform:

decoding prediction information of a block from a coded video bitstream, the prediction information being indicative of a reference line selected from a plurality of potential reference lines and an intra prediction mode selected from a set of potential intra prediction modes that is associated with the reference line; and reconstructing at least one sample of the block according to the intra prediction mode and at least one reference sample in the reference line, wherein the prediction information is indicative of a non-zero reference line and a first set of potential intra prediction modes associated with the non-zero reference line has a smaller number of potential intra prediction modes compared to a second set of potential intra prediction modes associated with a zero reference line, and the first set of potential intra prediction modes lacks adjacent directional intra prediction modes.

\* \* \* \* \*